United States Patent [19]
Perichon et al.

[11] Patent Number: 5,380,040
[45] Date of Patent: Jan. 10, 1995

[54] SECURITY ASSEMBLY FOR SEPARABLE COUPLING DEVICE, PARTICULARLY FOR MOTOR VEHICLE STEERING COLUMNS

[75] Inventors: Olivier Perichon; Patrick Ponchet, both of Vendome, France

[73] Assignee: NACAM, Vendome, France

[21] Appl. No.: 49,570

[22] Filed: Apr. 19, 1993

[30] Foreign Application Priority Data

Feb. 26, 1993 [FR] France ............... 93 02271

[51] Int. Cl.6 ............................................. B62D 1/19
[52] U.S. Cl. ..................................... 280/777; 74/492; 403/2
[58] Field of Search ............... 280/777; 74/492; 403/2, 403/24

[56] References Cited

U.S. PATENT DOCUMENTS

| 3,760,649 | 9/1973 | Decouzon | 74/492 |
| 4,730,508 | 3/1988 | Haldric et al. | 280/777 |
| 5,074,161 | 12/1991 | Hancock | 280/777 |
| 5,201,545 | 4/1993 | Boersma | 280/777 |
| 5,248,214 | 9/1993 | Duffy et al. | 403/2 |

FOREIGN PATENT DOCUMENTS

| 0203845 | 12/1986 | European Pat. Off. . |
| 0497118A2 | 8/1992 | European Pat. Off. . |
| WO92/17362 | 10/1992 | European Pat. Off. . |
| 2102555 | 4/1972 | France . |
| 2118275 | 7/1972 | France . |
| 1174540 | 12/1969 | United Kingdom . |
| 2231312 | 11/1990 | United Kingdom . |

Primary Examiner—Eric D. Culbreth
Assistant Examiner—Paul N. Dickson
Attorney, Agent, or Firm—Emmanuel J. Lobato

[57] ABSTRACT

Safety assembly for a separable coupling device, particularly for a motor vehicle steering column having two coaxially arranged shaft sections whose end portions are offset with respect to their common geometric axis and which overlap. Each shaft section carries a plate. Each plate is connected to the other plate by separable link pins. The safety assembly comprises a clip made up of a fork having two faces connected to each other by a web so that each of the two faces bears against one side of a corresponding plate:
  one of the two faces has a system for attaching one of the ends of one part of the link pins;
  the other face has a system for clamping one of the ends of the other part of the link pins;
  one of the two faces is provided with openings intended to receive the corresponding end of the link pins that are not connected to the face, in such a way that the clip blocks the axial separation of the two plates with respect to each other when this separation occurs at a slow speed frontal impact, while at the same time permitting this separation when a frontal impact occurs at high speed.

7 Claims, 2 Drawing Sheets

SECURITY ASSEMBLY FOR SEPARABLE COUPLING DEVICE, PARTICULARLY FOR MOTOR VEHICLE STEERING COLUMNS

BACKGROUND OF THE INVENTION

This invention relates to transmission columns and in particular motor vehicle steering columns which separate on impact.

When a motor vehicle is subjected to a frontal impact, the steering wheel carried by the steering column is liable to be displaced towards the driver in the passenger space of the vehicle. One of the solutions retained to avoid this displacement of the steering wheel, endangering the driver, consists in rendering the steering column separable on impact. To achieve this, two sections of a steering column are connected by two plates each fitted to a section and joined together by two pins which are rigidly locked to one of the plates, and mounted so as to slide axially in orifices provided in the other plate. This type of construction was the object in particular of French patent 85.07.792 filed by the Applicant.

However, under certain operating conditions, this type of separable coupling has the drawback of separating without there being any real impact.

The object of this invention is to propose a safety assembly for a separable coupling device which guarantees that this link will remain intact in all conditions of use of the vehicle except in the case of a frontal impact whose predetermined threshold value is such that the separable coupling device actuates.

In accordance with the invention, the safety assembly for a separable coupling device, particularly for a motor vehicle steering column, includes two coaxially arranged shaft sections whose end portions are offset with respect to their common geometric axis and which overlap, said end portions each carrying a plate. Each of these plates is connected to the other plate by separable link pins. The safety assembly comprises a clip made up of a fork having two faces connected to each other by a web so that each of the two faces bears against one side of the corresponding plate:

- one of the two faces has a system for attaching one of the ends of one part of the link pins;
- the other face has a system for clamping one of the ends of the other part of the link pins;
- one of the two faces is provided with openings intended to receive the corresponding end of the link pins that are not connected to the face, in such a way that the said clip blocks the axial separation of the two plates with respect to each other when this separation occurs at slow speed, while at the same time permitting this separation when it occurs at high speed.

More precisely, the safety assembly, in accordance with the invention, is characterized in that:

- the said link pins fixed to each plate are engaged in holes provided in the other plate via bushings;
- one of the two faces of the clip has a system for attaching the bushings of one part of the link pins;
- the other face of the clip has a system for clamping the bushings of the other part of the link pins;
- one of the faces is provided with openings intended to receive the corresponding end of the link pins whose bushings are not connected to said face.

To the advantage of the separable coupling device in accordance with the invention:

- each plate is provided with an orifice in which the end portion of the corresponding shaft section is engaged;
- each plate comprises two lateral protrusions which delimit between them a hollowing for the passage of the end portion to which the other plate is fixed;
- the link pins are each fixed in a lateral protrusion of each plate.

To ensure even greater reliability of the system, the safety assembly in accordance with the invention comprises a fusible plate arranged between the two plates and between each of the plates and the end portion carrying the other plate, this fusible plate being secured at each of its two ends to the side of the corresponding plate in such a way that the said fusible plate blocks the axial separation of the two plates with respect to each other when this separation occurs at slow speed and for a lower value than that of the clip, while permitting this separation when it occurs at high speed.

In accordance with a particularly interesting embodiment of the invention, the clip:

- is made up of a fork having two faces connected to each other by a web;
- one of the two faces having an attachment system made up of two holes receiving the bushes of the link pins;
- the other face having a clamping system made up of two openings provided with a narrowing which receives the bushings of the other link pins;
- one of the faces also has two holes intended to receive the corresponding end of the link pins whose bushings are not connected to said face.

In order to ensure best possible adaption to the structure of the separable coupling device, the fusible plate is made up of a central part provided with a neck and two ends. The width of the central part is chosen according to the width of the hollowings of the plates. One of the ends is shaped as a heel in order to bear against the face of the corresponding plate, whereas the width of the other end is substantially equal to the width of the central part and has two wings which are folded back, at the end of assembly, against the face of the other plate.

Thus the safety assembly in accordance with the invention presents the advantage of being able to be installed in a separable coupling system for a steering column, the object of which is to make it possible for the steering shaft of a motor vehicle to separate in the event of a frontal impact so as to prevent the steering wheel from rising towards the driver. This safety assembly in accordance with the invention makes it possible to add a safety device comprising a clip and a fusible plate which act separately from each other. The other features of this assembly, which are particularly advantageous, are that it does not modify the separation forces of the separable coupling device, and intervenes only for forces whose value is clearly different from that of the impact threshold at which the separable coupling device intervenes. Moreover, the clip blocks the axial drift of the two plates when it occurs at slow speed by means of holes made for this purpose on one of the faces of the clip, the clip then interfering with the corresponding end of the link pins. In contrast, when it occurs at high speed, the clip does not block this axial separation of the two plates with respect to each other, i.e. in dynamic mode, which is the case in impacts for which the separable coupling device was initially designed, since the ends of the link pins do not have time to engage in the holes made in the corresponding face of the clip.

BRIEF DESCRIPTION OF THE DRAWING

Additional advantages of the invention will appear hereinafter from the following purely illustrative and non-limiting detailed description of particular embodiments of the invention which must be read in conjunction with the accompanying drawings wherein.

DESCRIPTION OF THE PREFERRED EMBODIMENTS

Figure 1:
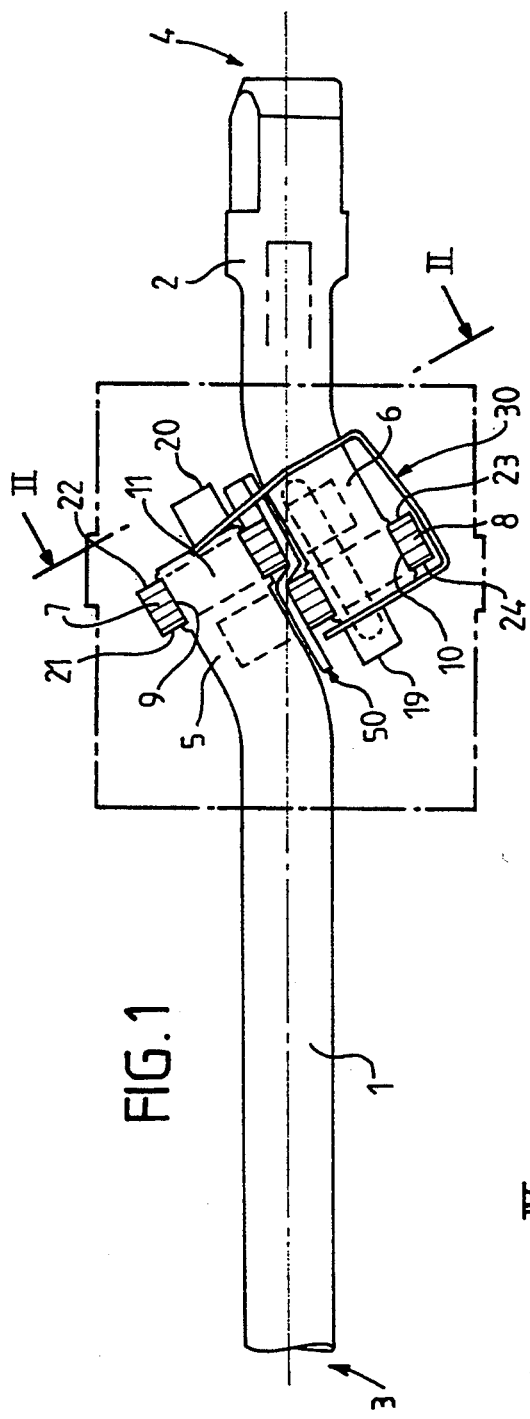
FIG. 1 shows a longitudinal view of the safety assembly of a separable coupling device in accordance with the invention.

FIG. 1 shows an intermediary portion of a steering column formed from two shaft sections 1, 2 which are each fixed to a corresponding universal joint 3, 4 connected to the rest of the steering column, the universal joints are not shown in the Figure.

Each shaft section 1, 2 comprises an end portion 5 and 6 on the end opposite the corresponding universal joint 3 and 4. Each end portion 5 and 6 is offset so that it makes a predetermined angle with the main axis of the considered portion of the steering column.

The end portions 5 and 6 overlap and each carries a plate 7 and 8. Each end plate 7 and 8 is fixed to the corresponding end portion via an orifice 9 and 10 made in each of the plates 7 and 8.

Figure 3:
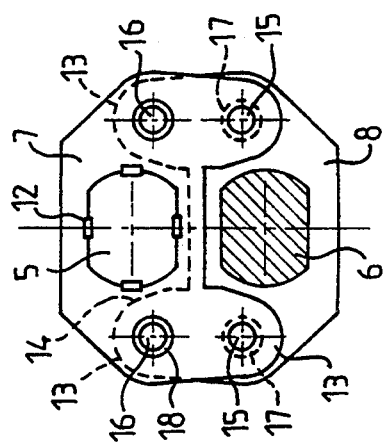
FIG. 3 is a cross-sectional view similar to FIG. 2 showing only the separable coupling device.
Figure 2:
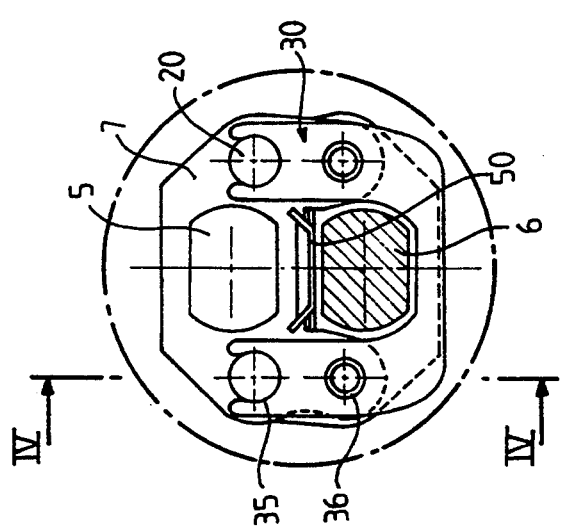
FIG. 2 shows a cross-sectional view along the line II—II of FIG. 1.
Figure 4:
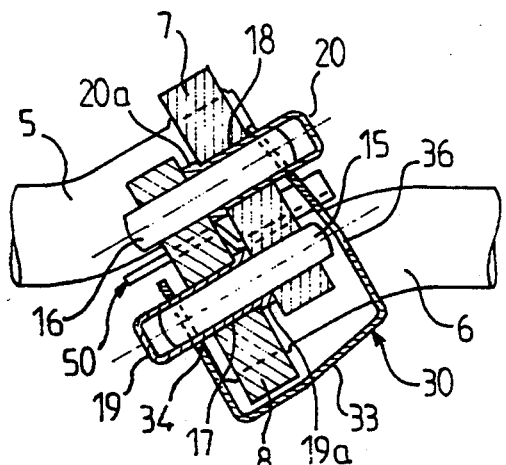
FIG. 4 is a cross-sectional view along the line IV—IV of FIG. 2.

The clips have a complementary shape to that of the corresponding end portions 5, 6 which are engaged in these orifices. The end portions 5 and 6 to advantage present a splined surface 11, and the plates 7 and 8 are fixed respectively to the corresponding end portions 5 and 6 by hammering on the shaft end referenced 12 in FIG. 3.

Each plate 7 and 8 comprises two lateral protrusions 13 which delimit between them a hollowing 14 made for the passage of the end portion 6 and 5 to which the other plate 8 and 7 is fixed.

The link pins 15 and 16 are fixed in each protrusion 13 of plates 7 and 8, this rigid locking being achieved by crimping these link pins 15 and 16. These link pins 15 and 16 are engaged so as to slide axially in corresponding holes 17 and 18 made in the other plate.

More particularly, in accordance with the invention, link pins 15 and 16 are mounted in corresponding holes 17 and 18 via bushings referenced respectively 19 and 20. These bushings are made from a friction material, for example from a rigid plastic material and are each provided with a shouldered edge 19a and 20a. These shouldered edges each form a cross-piece that defines the distance between the plates 7 and 8 in the assembled position.

In the embodiment shown in the figures, plates 7 and 8 are identical in shape and are mounted in a symmetrical configuration with respect to the axis of the considered column portion. Advantageously, the four link pins 15 and 16 are given a small diameter thus rendering them deformable so as to avoid brutal rupturing.

The assembly thus formed provides a means of ensuring rigid holding of shaft sections 1 and 2 and of transmitting the steering torque. Plates 7 and 8 are displaced starting from a given force threshold, this displacement being ensured with a controlled force. When link pins 15 and 16 are totally clear of orifices 17 and 18 of the plates in which they are normally engaged, the two shaft sections 1 and 2 are freed with respect to each other.

The safety assembly for separable coupling device in accordance with the invention comprises a clip 30 and a fusible plate 50.

Clip 30 is made up of a fork which has two faces referenced respectively 31 and 32, said faces being connected to each other by a web 33. This fork is shaped in such a way that each of the two faces 31 and 32 bears against a side of the corresponding plate 7 and 8, as can be seen in FIG. 1.

In a general way, clip 30, in accordance with the invention, is arranged such that:
  one of the two faces, for example face 31, has a system for attaching one of the ends of a part of link pins 15 and 16;
  the other face 32 has a system for clamping one of the ends of the other part of link pins 15 and 16;
  one of the two faces, for example face 32, has openings which are intended to receive the corresponding end of the link pins which are not connected to it.

More precisely, referring to the embodiment shown in the figures, the structure of clip 30 is such that:
  one of the two faces, i.e. face 31, has a system for attaching the bushings 19 of a part of link pins 15 and 16;
  the other face 32 of clip 30 has a system for clamping the bushings 20 of the other part of link pins 15 and 16;
  face 32 is also provided with openings which are intended to receive the corresponding end of link pins 15 and 16, whose bushings 19 are not connected to this face 32.

Figure 5:
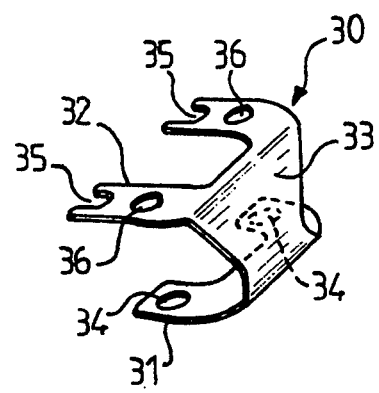
FIG. 5 is a view in perspective of the clip of the safety assembly in accordance with the invention.
Figure 6:
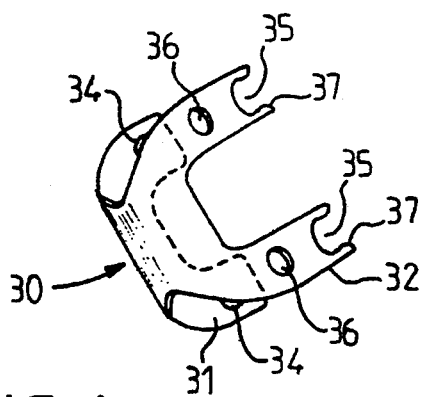
FIG. 6 is a view in perspective of the clip shown in FIG. 5 in another position.
Figure 7:
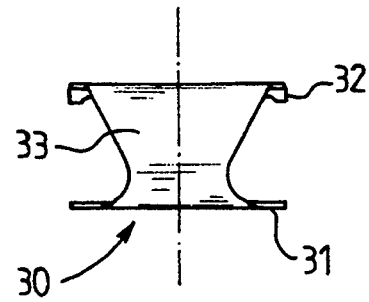
FIG. 7 is an end view of the clip shown in FIG. 5.

The structure of clip 30 is shown in detail in FIGS. 5, 6 and 7. In this embodiment, clip 30 is made up of a fork which has two faces 31 and 32 that are connected to each other by a web 33. Face 31 has an attachment system made up of two holes 34, which are intended to receive the bushings 19 of the corresponding link pins 15. Face 32 has a clamping system, which is made up of two openings 35 each provided with two narrowings 37. The shape of each of these two openings 35 is adapted to the contour of bushings 20 of the other link pins 16 which engage in these openings 35 after breaking through a hard point created by narrowing or constriction 37. Moreover, face 32 also has two holes 36 which are intended to receive the corresponding end of link pins 15 whose bushings 19 are not connected to this face 32.

As shown in FIG. 1, clip 1 is mounted on the separable coupling device by means of these two holes 34 made in face 31 and which receive the bushings 19 of link pins 15, while the two openings 35 of face 32 clamp the bushes 20 of the other link pins 16. In this configuration, the two holes 36 made in face 32 face the corresponding end of link pins 15 whose bushings 19 are not connected to this face 32.

Before fitting the clip 30 to the described separable coupling device, the device may already comprise fusible plate 50. In this case, fusible plate 50 is arranged between the two plates 7 and 8, and between each of the plates 7 and 8 and the end portion 6 and 5 carrying the other plate 8 and 7. Fusible plate 50 is secured at each of its two ends to the side of the corresponding plate 7 or 8. In this way, fusible plate 50 blocks the axial separation of the two plates 7 and 8 with respect to each other when this separation occurs at slow speed and for a value much lower than that intended for the clip 30, while permitting this separation when it occurs at high speed. The values of the opening force of the clip 30 and of the rupture of the fusible plate 50 can be adapted to requirements by judicious dimensioning of these elements.

Figure 8:
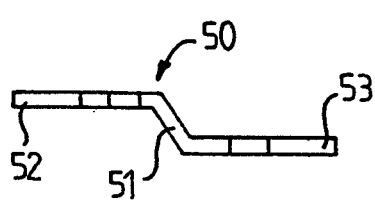
FIG. 8 is a view from above of the fusible plate of the safety assembly in accordance with the invention.
Figure 9:
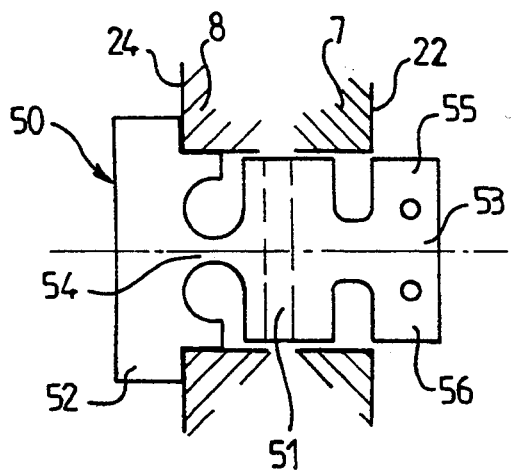
FIG. 9 is a side view of the fusible plate shown in FIG. 8.

As can be seen in FIGS. 8 and 9, the fusible plate 50 is made up of a central part 51 which has a neck 54. This central part is prolonged on each side by an end 52 and 53. The width of the central part 51 is chosen according to the width of the hollowings 14 of plates 7 and 8. One of the ends 52 is shaped as a heel so as to bear against face 24 of the corresponding plate 8. The width of the other end 53 is substantially equal to the width of the central part 51 and has two wings 55 and 56. These two wings 55 and 56 are folded back against face 22 of the other plate 7 at the end of assembly.

We claim:

1. A safety assembly for a separable connecting device for separably coupling two shaft sections of a motor vehicle steering column which have end portions offset with respect to a common geometric axis and said end portions disposed in overlapping relationship; said connecting device comprising;
    two plates oppositely disposed, each fixedly mounted on a respective one of said end portions extending in a direction transversely thereof;
    a forked clip having two oppositely disposed fork portions having inner surfaces spaced from each other disposed overlying respective opposite outer sides of the two oppositely disposed plates;
    a plurality of connecting pins extending through openings in the plates in a longitudinal direction of the offset end portions;
    one set of said connecting pins having respective ends fixed to one of said plates and opposite ends thereof coupled to a fork portion of said forked clip disposed opposite the outer side of the other plate;
    another set of said connecting pins having respective ends fixed to said other plate and opposite ends thereof coupled to the other fork portion of the forked clip disposed opposite the outer side of said one plate;
    said plates, said forked clip and said plurality of connecting pins effectively coupling the two end portions for steering of the vehicle;
    and said forked clip effectively precluding axial separation of the two plates when the vehicle is subjected to a frontal impact force at slow speeds and permitting axial separation when said vehicle is subjected to a frontal impact at a high speed.

2. A safety assembly for a separable connecting device for separably coupling two shaft sections of a motor vehicle steering column, according to claim 1; in which each of said connecting pins has a sleeve bushing on an end thereof coupled to the corresponding clip portion and each bushing extending axially through a respective plate;
    each bushing having an open end having a circumferential flange, each flange of each connecting pin being disposed between the two plates separating the two plates;
    each said bushing frictionally coupling the individual connecting pins to a corresponding plate;
    and each bushing coupling a corresponding end of said connecting pins on which the bushing is mounted to a corresponding portion of said forked clip.

3. A safety assembly for a separable connecting device for separably coupling two shaft sections of a motor vehicle steering column, according to claim 2, in which each said plate has a lateral protrusion and the ends of the connecting pins fixed to a corresponding plate are connected to the lateral protrusion of the plate to which they are fixed.

4. A safety assembly for a separable connecting device for separably coupling two shaft sections of a motor vehicle steering column according to claim 3, in which said oppositely disposed forked portions each bear on the respective lateral protrusion of a corresponding plate.

5. A safety mechanism for a separable connecting device for separably coupling two shaft sections of a motor vehicle steering column, according to claim 1, in which said forked clip comprises a web and the fork portions are connected to each other by said web maintaining the fork portions laterally spaced oppositely disposed and extending in a same direction from said web.

6. A safety assembly for a separable connecting device for separably coupling two shaft sections of a motor vehicle steering column according to claim 1,
    including a rupturable plate between said two plates and between the two end portions, said rupturable plate having two ends thereof each fixed to a respective side of the plates fixedly mounted on said end portions; and
    said rupturable plate precluding said axial separation at a substantially lower value frontal impact force than said forked clip and permitting said axial separation at a frontal impact three at a high speed.

7. A safety assembly for a separable connecting device for separably coupling two shaft sections of a motor vehicle, according to claim 6, in which said rupturable plate comprises a neck between opposite ends thereof, and the ends thereof disposed bearing against a respective outer side of a respective plate fixedly mounted on said offset end portions.

* * * * *